United States Patent [19]

Engelman et al.

[11] 3,930,055

[45] Dec. 30, 1975

[54] VERY LOW CARBOHYDRATE BAKED PRODUCT

[76] Inventors: Elaine Green Engelman, 938 Berkeley Ave.; Dorothy Neri, 328 Hillcrest Ave., both of Trenton, N.J. 08618

[22] Filed: Nov. 16, 1973

[21] Appl. No.: 416,407

Related U.S. Application Data

[63] Continuation-in-part of Ser. No. 258,268, May 31, 1972, abandoned.

[52] U.S. Cl. ................ 426/644; 426/550; 426/655; 426/656; 426/657; 426/804
[51] Int. Cl.² A21D 13/04; A21D 13/06; A23J 3/00
[58] Field of Search ........... 426/152, 153, 159, 550, 426/655, 644, 656, 657, 804

[56] References Cited
FOREIGN PATENTS OR APPLICATIONS
1,060,071  2/1967  United Kingdom .............. 99/90 HP

*Primary Examiner*—James R. Hoffman
*Attorney, Agent, or Firm*—Daniel E. Kramer

[57] ABSTRACT

Ingredients and process for producing baked products having a very low carbohydrate content yet with satisfactory density, texture, color, toastability, aroma and other properties found desirable in high carbohydrate breads, rolls and cakes, such as those produced from whole or patent wheat flours. The essential ingredients for the baked product are proteinaceous powders with less than 10% carbohydrate content, such as the high protein powder produced from the soybean or other sources, non-yeast leavening, such as baking powder and cream of tartar, and water sufficient to generate suitable consistency of the dough. Varying amounts of cottage cheese and eggs can be added in order to modify texture, aroma and toothiness with only slight increase in carbohydrate content.

8 Claims, No Drawings

VERY LOW CARBOHYDRATE BAKED PRODUCT

This is a continuation-in-part of application Ser. No. 258,268 filed May 31, 1972, now abandoned.

BACKGROUND OF THE INVENTION:

1. Field

This invention pertains to the field of manufacture of baked food products. Recent advances in medicine have disclosed that a certain class of illness, hypoglycemia, also known as low blood sugar, or hyperinsulinism, which is a disease characterized by extreme sensitivity to sugars and starches otherwise known as carbohydrates, is best treated by a diet which is essentially free of carbohydrates.

The most common factor adversely affecting the health of the average American is an overweight condition. Recent advances in nutrition have disclosed that satisfactory weight control can be achieved over long periods of time without significant limits on the amount of food eaten, providing the diet is essentially restricted to proteins and fats, with the carbohydrate content of the diet reduced essentially to zero. Sufferers of the overweight syndrome are frequently compulsive eaters and feel dissatisfied unless their diet includes significant quantities of bread, cake or rolls. The product of this invention is a baked product, and can be cake or rolls, which can be freely eaten by those suffering from hypoglycemia or who wish to reduce their weight by means of a diet which is essentially free of carbohydrates.

2. Description of Prior Art

Bread has between 45 and 52 percent carbohydrate. Its primary component is whole or patent flour which contains about 75–80 percent carbohydrate. Yeast, which is used as a leavening agent, has 35–40 percent carbohydrate.

Lower carbohydrate bread has been made with wheat gluten flour. A so-called gluten flour, containing 45 percent gluten and 55 percent patent flour, has 45 percent carbohydrate, which is only 62 percent of the carbohydrate in patent flour.

Bread to rise must have dough with a gluey consistency. The leavening agent must form gas bubbles in the dough. These gas bubbles must not break until the rising process is complete and the baking process has caused the walls of the gas bubble to denature and dehydrate. Through this process the walls become semi-rigid, generating the effect of solidifying the porous mass into the product we know as bread. Gluey consistency is a property of the gluten. Through the use of gluten, bubbles with a high degree of gas tightness are achieved so that the relatively slow gas liberation generated by the yeast does not leak out. The gas leakage would cause collapse of the bubbles, which would result in a heavy, dense product. Therefore, yeast bread traditionally had to employ gluten flours.

By contrast, quickbread, that is, those baked products which can be put in the oven immediately on mixing and do not require an extended rising period, do not need as leakproof a bubble formation as that provided by yeast and gluten. The inventors found that they could utilize the fast rising characteristics of non-yeast leavening, such as used in quick breads, to make a non-gluten bread using essentially zero carbohydrate constituents. Efforts by others to minimize the carbohydrate and/or increase the protein content were directed toward substituting powder of a higher protein content for a percentage of the wheat flour. Although there has been considerable activity in the direction of reducing the carbohydrate content of bread and other baked products by the addition of high protein substances or foods such as casein or soy flour or the substitution of dietary nullities, such as bran of cereals or the endosperm of oil seeds which have high percentages of indigestible or unavailable carbohydrates, such as cellulose, pentosans and the like, in no case have baked products been suggested with carbohydrate content approaching zero.

BRIEF SUMMARY OF THE INVENTION

This invention discloses a formula and a process for making baked products, such as bread, cake or rolls, which have very low carbohydrate content, but which have taste, aroma, density and toastability which approach those properties of baked products made with wheat flours. The formulae utilize proteinaceous powders having less than 10 percent carbohydrate such as those manufactured or extracted from grains, soybeans, nuts or other protein sources such as milk, fish or eggs; moist soft curd milk or non-milk cheeses, classed as cottage cheese, such as cottage, farmer, pot, ricotta, feta, or moist protein curds; leavening, such as baking powder or baking soda plus an organic acid, such as tartaric, citric or lactic, which is found in sour milk.

DETAILED DESCRIPTION OF THE PREFERRED EMBODIMENT:

Formulae A, B, C, D and E are set forth in Table 1. The basic very low carbohydrate baked product is made according to Formula A and is composed solely of soy protein, water and non yeast leavening. Variations in texture, color and flavor, such as white color, brown color, sweet taste, nutty taste, are created in Formulae B, C, D and E by additions of whole eggs, cottage cheese, sesame seeds, nuts, and oil in small amounts. The proportions of eggs given in the recipes are for fresh eggs. Dried eggs plus water can be substituted.

Proteins are composed of a large number of different nitrogen bearing organic compounds called amino acids. Although there are at least 22 amino acids, eight of these are generally considered essential to human nutrition. All of these amino acids must be consumed in the correct relative proportions in order for them to be nutritionally effective. Although animal protein is generally nutritionally complete, i.e., containing all the essential amino acids in proper ratio, vegetable protein is generally lacking in or is low in content of or contains an unfavorable ratio of one or more of the essential amino acids, Tryptophan, Lysine and Methionine (or Cystine). These must be consumed in the proportion:

| Tryptophan | | 1 |
|---|---|---|
| Lysine | 43% | 3 |
| Methionine and/or Cystine | | 3 |

This invention allows protein from varied sources to be combined to compliment each other in their amino acid compositions so that the most efficient utilization of amino acids can be achieved.

Soy protein contains all the amino acids necessary for human nutrition but is limited in Cystine and Methionine. A nutritionally complete protein food is created by the addition of proteins high in Cystine and Methionine, such as found in Brazil nuts, sesame seeds, eggs and milk. The following are the procedures for making one loaf with each formula. Obviously, smaller or larger quantities could be made at one time or the process could be continuous as might be required by commercial manufacturing machinery.

Preheat the oven to 350°F. Grease a loaf pan 4 inches wide, 8 inches long, 2½ inches high.

FORMULA A

Take 160 grams proteinaceous powder having less than 10 percent carbohydrate powder, 8 grams baking soda, 8 grams cream of tartar, ¼ teaspoon salt, and mix thoroughly. Then add 255 grams water and knead into a dough. Immediately place in an appropriately sized baking tin and bake in a 350° oven for approximately 55 minutes.

FORMULA B

Mix the dry ingredients, 140 grams of proteinaceous powder having less than 10 percent carbohydrate, 8 grams baking soda and 8 grams cream of tartar to form mixture A. Mix 310 grams of whole eggs and 140 grams of cottage cheese, 2 grams of vanilla extract and 1½ grain of saccharin sweetener to form Mixture B. Other no-carbohydrate sweeteners can be used in place of the saccharin.

tracted from sesame seeds, 40 grams of proteinaceous powder having less than 10 percent carbohydrate which has been extracted from soy, 8 grams of baking soda, 4 grams of citric acid, 2½ grams of salt and 8 grams of caraway seeds.

To the mixed, dry ingredients, add 26½ grams of water, 0.5 grams of sodium carboxy-methyl cellulose, sodium saccharin to taste, 0.004 grams sodium benzoate.

Next, add all of the blended cheese yolk mixture to the moistened dry ingredients and mix well to form the batter. Beat 95 grams of egg whites until slightly thick but not stiff. Pour the whites onto the batter; stir until well mixed; spoon all the batter into the greased loaf pan and bake in the pre-heated oven for approximately 55 minutes or until done.

FORMULA E

Add 22½ grams of vegetable oil, 60 grams of water, 15 grams of baking soda, 15 grams of cream of tartar to 130 grams of whole eggs and mix thoroughly. Add this liquid to 100 grams of proteinaceous powder having less than 10 percent carbohydrate. This powder may be extracted from any convenient protein source, such as those enumerated under Brief Summary of the Invention. Then blend the cottage cheese with the other ingredients to form the dough, which is baked in the same way as the dough of Formula A.

TABLE 1

| FORMULA INGREDIENT | WEIGHT PERCENT ON DRY BASIS | | | | |
|---|---|---|---|---|---|
| | A | B | C | D | E |
| PROTEINACEOUS POWDER: | | | | | |
| Soya | 91 | 23 | 16.0 | 12.2 | 18.4 |
| Nuts | | | 15.0 | | |
| Sesame | | | | 12.8 | |
| LEAVENING: | | | | | |
| Baking Soda | 4.5 | 1.3 | 1.6 | 2.0 | 2.8 |
| Cream of Tartar | 4.5 | 1.3 | 1.6 | | 2.8 |
| Citric Acid | | | | 1.0 | |
| EGGS: | | | | | |
| Whole | | 51 | 20.0 | | 24.0 |
| Whites | | | | 25.4 | |
| Yolks | | | | 17.3 | |
| MOIST PROTEIN CURDS | | 23 | 45.4 | 21.3 | 42.4 |
| OIL | | | | | 4.1 |
| SEASONING | | .4 | .4 | 3.0 | 5.5 |
| TOTAL | 100 | 100 | 100 | 100 | 100 |

Mix together A and B and when well mixed, knead into a dough and bake approximately 55 minutes.

FORMULA C

Blend 100 grams eggs, 225 grams cottage cheese, 4½ grains saccharin and 2 grams vanilla to form Mixture A. Mix dry in a bowl 80 grams of proteinaceous powder having less than 10 percent carbohydrate, 8 grams baking soda, 8 grams cream of tartar and 75 grams of finely ground nuts to form Mixture B. Mix together Mixtures A and B and add 60 grams of water. Knead, form into loaf shape and bake approximately 55 minutes.

FORMULA D

Blend until smooth 65 grams of egg yolk and 80 grams of cottage cheese in a blender. Then mix dry in a bowl 55 grams of proteinaceous powder having less than 10 percent carbohydrate which has been ex-

I claim:
1. A very low carbohydrate baked product made from dough, said dough consisting principally of proteinaceous powder having less than 10% carbohydrate and leavening agent.

2. A very low carbohydrate baked product as in claim 1 where said powder in the dough is extracted from at least one of the group consisting of soybeans, grains, sesame seeds, alfalfa seeds, caraway seeds, pumpkin seeds, poppy sees, sunflower seeds, milk, fish, eggs and bonemeal.

3. A low carbohydrate baked product as in claim 2 where the proteinaceous powders in the dough containing varying ratios of the amino acids Tryptophan, Lysine and (Methionine + Cystine), said powders extracted from members of the group are combined to produce a product wherein the quantities of these amino acids approach within ± 20 percent the ratio of

| | |
|---|---|
| Tryptophan | 1 |
| Lysine | 3 |
| Methionine and/or Cystine | 3 |

4. A low carbohydrate baked product as in claim 1 where the dough includes moist protein curds.

5. A low carbohydrate baked product as in claim 4 where the dough includes eggs.

6. A low carbohydrate baked product as in claim 5 where the percentage of eggs in the dough is less than 51 percent of the weight of the dough, excluding water.

7. A low carbohydrate baked product as in claim 4 where the percentage of protein curds in the dough is less than 54 percent.

8. A low carbohydrate baked product as in claim 1 where the percentage of the powder in the dough is within the range of 18.4 to 91 percent on a dry basis.

* * * * *

UNITED STATES PATENT AND TRADEMARK OFFICE
CERTIFICATE OF CORRECTION

PATENT NO. : 3,930,055
DATED : December 30, 1975
INVENTOR(S) : Elaine Green Engelman and Dorothy Neri It is certified that error appears in the above-identified patent and that said Letters Patent are hereby corrected as shown below:

In column 2, within the table, line 58, delete "43%".

In Claim 2, line 5, change "poppy sees" to -- poppy seeds -- .

Signed and Sealed this twentieth Day of April 1976

[SEAL]

Attest:

RUTH C. MASON
Attesting Officer

C. MARSHALL DANN
Commissioner of Patents and Trademarks